United States Patent
Ogawa et al.

(10) Patent No.: US 10,246,076 B2
(45) Date of Patent: *Apr. 2, 2019

(54) CONTROL APPARATUS

(71) Applicant: TOYOTA JIDOSHA KABUSHIKI KAISHA, Toyota-shi (JP)

(72) Inventors: Yuki Ogawa, Toyota (JP); Mitsuharu Kato, Kasugai (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 84 days.

This patent is subject to a terminal disclaimer.

(21) Appl. No.: 15/219,927

(22) Filed: Jul. 26, 2016

(65) Prior Publication Data

US 2017/0028980 A1 Feb. 2, 2017

(30) Foreign Application Priority Data

Jul. 31, 2015 (JP) .................. 2015-152892

(51) Int. Cl.
*B60W 10/06* (2006.01)
*B60W 10/08* (2006.01)
(Continued)

(52) U.S. Cl.
CPC ............ *B60W 20/14* (2016.01); *B60K 6/445* (2013.01); *B60W 10/06* (2013.01); *B60W 10/08* (2013.01);
(Continued)

(58) Field of Classification Search
CPC ...... B60W 20/14; B60W 10/08; B60W 20/12; B60W 30/18127; B60W 10/06;
(Continued)

(56) References Cited

U.S. PATENT DOCUMENTS 5,778,326 A 7/1998 Moroto et al.
9,205,839 B2 12/2015 Lennevi et al.
(Continued)

FOREIGN PATENT DOCUMENTS

CN 104284823 A 1/2015
EP 2 847 054 B1 7/2016
(Continued)

OTHER PUBLICATIONS

Office Action dated Jun. 16, 2017 in co-pending U.S. Appl. No. 15/215,272.

(Continued)

*Primary Examiner* — Alan D Hutchinson
(74) *Attorney, Agent, or Firm* — Oblon, McClelland, Maier & Neustadt, L.L.P.

(57) ABSTRACT

A control apparatus and method for a hybrid vehicle that searches for and determines a scheduled travel route and a downhill section included in the scheduled travel route on the basis of positional information of the vehicle and road information. The control apparatus determines a section from a downhill control start point to an end point of a target downhill section as a controlled target section. The downhill control start point is located a predetermined first distance before a start point of the target downhill section. When the vehicle travels on the controlled target section, the control apparatus executes downhill control. Even in a situation in which a target downhill section is newly determined during execution of the downhill control, the control apparatus continues the downhill control until the vehicle reaches an end point of the controlled target section for which the downhill control is started.

5 Claims, 9 Drawing Sheets

(51) Int. Cl.
- *B60W 10/26* (2006.01)
- *B60W 20/12* (2016.01)
- *B60W 20/14* (2016.01)
- *B60K 6/445* (2007.10)
- *B60W 30/18* (2012.01)

(52) U.S. Cl.
CPC .......... *B60W 10/26* (2013.01); *B60W 20/12* (2016.01); *B60W 30/18127* (2013.01); *B60W 2530/00* (2013.01); *B60W 2550/142* (2013.01); *B60W 2550/143* (2013.01); *B60W 2550/145* (2013.01); *B60W 2550/402* (2013.01); *B60W 2710/06* (2013.01); *B60W 2710/08* (2013.01); *B60W 2710/244* (2013.01); *B60Y 2200/92* (2013.01); *B60Y 2300/181* (2013.01); *Y02T 10/6239* (2013.01); *Y02T 10/6286* (2013.01); *Y02T 10/7258* (2013.01)

(58) Field of Classification Search
CPC ........... B60W 10/26; B60W 2550/145; B60W 2550/142; B60W 2710/244; B60W 2550/143; B60Y 2300/181
See application file for complete search history.

(56) References Cited

U.S. PATENT DOCUMENTS

| | | |
|---|---|---|
| 2008/0262668 A1 | 10/2008 | Yamada |
| 2008/0319596 A1 | 12/2008 | Yamada |
| 2008/0319597 A1 | 12/2008 | Yamada |
| 2010/0324752 A1 | 12/2010 | Suganuma et al. |
| 2012/0032637 A1 | 2/2012 | Kotooka et al. |
| 2013/0015860 A1 | 1/2013 | Crombez |
| 2013/0296102 A1 | 11/2013 | Banker et al. |
| 2015/0019057 A1 | 1/2015 | Morisaki et al. |
| 2015/0073637 A1 | 3/2015 | Lennevi et al. |
| 2016/0167641 A1 | 6/2016 | Yoon |
| 2016/0368481 A1* | 12/2016 | Nuber .................. B60W 10/18 |
| 2017/0021730 A1 | 1/2017 | Ogawa |
| 2017/0021820 A1 | 1/2017 | Ogawa |
| 2017/0021823 A1 | 1/2017 | Ogawa |
| 2017/0028981 A1 | 2/2017 | Ogawa et al. |
| 2017/0088117 A1 | 3/2017 | Ogawa |

FOREIGN PATENT DOCUMENTS

| | | |
|---|---|---|
| JP | 09-308012 A | 11/1997 |
| JP | 2000-134719 A | 5/2000 |
| JP | 2003-9310 A | 1/2003 |
| JP | 2004-101245 A | 4/2004 |
| JP | 2004-248455 A | 9/2004 |
| JP | 2005-160269 A | 6/2005 |
| JP | 2007-223404 A | 9/2007 |
| JP | 2009-126450 A | 6/2009 |
| JP | 2010-6216 A | 1/2010 |
| JP | 2011-006047 A | 1/2011 |
| JP | 2013-119317 A | 6/2013 |
| JP | 2013-154715 A | 8/2013 |
| JP | 2013-154718 A | 8/2013 |
| JP | 2013-154720 A | 8/2013 |
| JP | 2014-24487 A | 2/2014 |
| JP | 2015-19521 A | 1/2015 |
| JP | 2015-73420 A | 4/2015 |
| WO | WO 2009/118624 A1 | 10/2009 |

OTHER PUBLICATIONS

Office Action dated Nov. 30, 2017 in co-pending U.S. Appl. No. 15/215,141, 16 pages.
Notice of Allowance dated Dec. 4, 2017 in U.S. Appl. No. 15/224,245, 14 pages.
U.S. Office Action dated May 8, 2018 for U.S. Appl. No. 15/215,141.
Notice of Allowance issued in U.S. Appl. No. 15/215,272 dated Dec. 26, 2017.
Corrected Notice of Allowability Issued in U.S. Appl. No. 15/215,272 dated Mar. 27, 2018.
Notice of Allowance Issued in U.S. Appl. No. 15/215,272 dated May 2, 2018.
Notice of Allowance Issued in U.S. Appl. No. 15/215,272 dated Jun. 14, 2018.
Notice of Allowance Issued in U.S. Appl. No. 15/224,245 dated Jun. 15, 2018.
Notice of Allowability Issued in U.S. Appl. No. 15/215,272 dated Jul. 18, 2018.
Notice of Allowability Issued in U.S. Appl. No. 15/215,141 dated Aug. 3, 2018.
Notice of Allowance issued in U.S. Appl. No. 15/224,245 dated Sep. 20, 2018.
Corrected Notice of Allowance issued in U.S. Appl. No. 15/215,141 dated Sep. 28, 2018.

* cited by examiner

CONTROL APPARATUS

INCORPORATION BY REFERENCE

The disclosure of Japanese Patent Application No. 2015-152892 filed on Jul. 31, 2015 including the specification, drawings and abstract is incorporated herein by reference in its entirety.

BACKGROUND OF THE DISCLOSURE

1. Field of the Disclosure

The present disclosure relates to a control apparatus for a hybrid vehicle including an internal combustion engine, an electric motor and a storage battery that supplies electric power to the electric motor.

2. Description of Related Art

Conventionally, a hybrid vehicle (hereinafter, also simply referred to as vehicle) travels while controlling an electric motor and an internal combustion engine such that the capacity of a chargeable and dischargeable storage battery is efficiently utilized for the purpose of improvement in the fuel consumption performance of the vehicle.

On the other hand, it is known that a repetitive change in an extremely large remaining amount of charge (hereinafter, also simply referred to as state of charge (SOC)) or extremely small remaining amount of charge of the storage battery accelerates the performance degradation of the storage battery. Therefore, the SOC of the storage battery is managed for the purpose of preventing the degradation of the storage battery. Specifically, the upper limit and lower limit of the SOC are prescribed, and a control apparatus manages the SOC such that the SOC does not go beyond the range (referred to as management range) between the upper limit and the lower limit.

That is, the control apparatus prohibits charging the storage battery when the SOC reaches the upper limit. At this time, electric energy that is generated as a result of regenerative braking is transformed into thermal energy in a friction brake device or an inverter or both, or the like, so energy originally recoverable and usable for propelling the vehicle is consumed uselessly. In contrast, when the SOC reaches the lower limit, the control apparatus forcibly charges the storage battery by using the output power of the internal combustion engine. As a result, fuel is consumed due to a cause other than propelling the vehicle. Therefore, causing the SOC not to reach the upper limit or the lower limit during traveling of the vehicle leads to effective improvement in the fuel consumption performance of the vehicle.

When the vehicle travels on such a downhill that the vehicle accelerates without using the torque (driving force) of the internal combustion engine or the electric motor, braking force is required from the vehicle when a driver releases the foot from an accelerator pedal or possibly further depresses a brake pedal. At this time, an increase in vehicle speed is reduced or prevented by the regenerative braking force of the electric motor, and electric power generated as a result of regenerative braking is supplied to the storage battery. As a result, the SOC of the storage battery increases.

Therefore, when the vehicle travels on a long downhill (that is, a section having a relatively long distance and a relatively large altitude difference), the SOC may reach the upper limit halfway on the downhill, and the SOC cannot be increased any more. This means that the effect of improvement in fuel consumption, which is obtained as a result of traveling on a downhill, increases as the difference between the upper limit of the SOC and the SOC at the start point of the downhill increases.

One of existing control apparatuses for a vehicle (hereinafter, referred to as existing apparatus) acquires the position of the vehicle, a destination, road information, and the like, with the use of a navigation system, and determines a scheduled travel route and a downhill section in the scheduled travel route on the basis of those pieces of information. The existing apparatus estimates the amount of electric power that is newly chargeable into the storage battery through regenerative braking in a period during which the vehicle travels on the determined downhill section. When the estimated amount of chargeable electric power is larger than an ordinary management range, the existing apparatus expands the management range of the storage battery to an expanded management range. In addition, the existing apparatus controls the electric motor or the internal combustion engine or both such that the SOC of the storage battery is consumed to the lower limit of the expanded management range by the time the vehicle starts traveling on the downhill section (see, for example, Japanese Patent Application Publication No. 2005-160269 (JP 2005-160269 A)). Hereinafter, such control is referred to as specific control, and a section on which specific control is executed is referred to as controlled target section.

However, usually, the road information that is acquired by the navigation system is periodically updated. For example, vehicle information communication system (VICS) (registered trademark) information that is one of such pieces of information is updated every five minutes. Therefore, if the road information is updated when the vehicle is in the middle of traveling on a downhill that is a controlled target section while executing specific control, and then a target downhill section is redetermined on the basis of the road information, the existing apparatus may not be able to determine the remaining part of the downhill on which the vehicle is traveling at that point in time (the part of the downhill on which the vehicle will travel thereafter) as a downhill section on which specific control should be executed because the distance and/or altitude difference of the remaining part is small. In this case, the existing apparatus stops specific control, so there is a concern that the effect of improvement in fuel consumption reduces.

BRIEF SUMMARY

The present disclosure provides a control apparatus for a hybrid vehicle, which is able to continue executing specific control up to an end point of a controlled target section for which the specific control is started even when the controlled target section is updated when the hybrid vehicle is in the middle of traveling on a downhill that is the controlled target section while executing the specific control (downhill control).

An aspect of the present disclosure relates to a control apparatus that is applied to a hybrid vehicle. The hybrid vehicle includes an internal combustion engine that serves as a drive source of the vehicle, an electric motor that serves as a drive source of the vehicle, and a storage battery that supplies electric power to the electric motor. The hybrid vehicle is configured to perform regenerative braking with the use of the electric motor and be able to charge the storage battery with electric power generated through the regenerative braking. The hybrid vehicle is also configured to be able to charge the storage battery with electric power generated by using output power of the internal combustion engine.

The control apparatus includes a controller. The controller is configured to control the internal combustion engine and the electric motor such that a required driving force that is required from the vehicle is satisfied and a remaining amount of charge of the storage battery approaches a target remaining amount of charge set to a normal remaining amount of charge. The controller is configured to acquire positional information, indicating a position of the vehicle, and road information, determine a scheduled travel route of the vehicle on the basis of the positional information and the road information, search for a target downhill section that satisfies a predetermined condition within the scheduled travel route on the basis of the road information pertaining to each road section that constitutes the scheduled travel route, determine a first controlled target section when the target downhill section is included in the scheduled travel route, the first controlled target section being a section from a downhill control start point to an end point of the target downhill section, the downhill control start point being located a predetermined first distance before a start point of the target downhill section, execute downhill control when the vehicle travels on the first controlled target section, the downhill control being control for changing the target remaining amount of charge to a first remaining amount of charge lower than the normal remaining amount of charge, and continue to execute the downhill control until the vehicle reaches an end point of the first controlled target section for which the downhill control is started even when the controlled target section is newly determined during execution of the downhill control.

With this configuration, when the controlled target section is newly determined before the hybrid vehicle passes through the end point of the controlled target section on which the downhill control should be executed during execution of the downhill control (in any one of a case where the timing of updating the controlled target section comes and a case where the controlled target section is actually updated), the downhill control is continuously executed until the hybrid vehicle passes through the end point. As a result, it is possible to sufficiently exercise the effect of improvement in fuel consumption, which is expected as a result of downhill control, so it is possible to improve the fuel consumption performance of the vehicle.

In this case, the controller may be configured to, at a point in time at which the vehicle has passed through the first controlled target section for which the downhill control is started (including timing just after the point in time), newly determine the controlled target section (second embodiment).

With this configuration, downhill control is continued until the vehicle passes through the end point of the initially determined controlled target section, and, even when a downhill section that can be the controlled target section subsequent to the end point of the initially determined controlled target section appears within a relatively short distance, it is possible to determine the new downhill section as the controlled target section with higher probability. As a result, it is possible to further improve the fuel consumption performance of the vehicle.

The controller may be configured to, when the scheduled travel route has been changed during execution of the downhill control, end the downhill control (step 640 to step 650).

With this configuration, when the scheduled travel route has changed as a result of departure of the vehicle from the scheduled travel route, a change of a destination, or the like, while the vehicle is traveling on the target downhill section, downhill control is immediately ended, so unnecessary downhill control is not executed when the vehicle departs from the target downhill section.

The elements of the present disclosure are not limited to the embodiments described below. Other features and associated advantages of the present disclosure will be easily understood from the embodiments of the present disclosure, which will be described with reference to the accompanying drawings.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4A and FIG. 4B are lookup tables that are consulted by a power management ECU (PM ECU) of the hybrid vehicle shown in FIG. 1, in which FIG. 4A is a lookup table in the case where a target remaining amount of charge is a normal remaining amount of charge and FIG. 4B is a lookup table in the case where the target remaining amount of charge is a first remaining amount of charge;

DETAILED DESCRIPTION OF EMBODIMENTS

Hereinafter, a control apparatus (hereinafter, also referred to as the control apparatus) for a hybrid vehicle according to embodiments of the present disclosure will be described with reference to the accompanying drawings.

First Embodiment

Configuration

Figure 1:
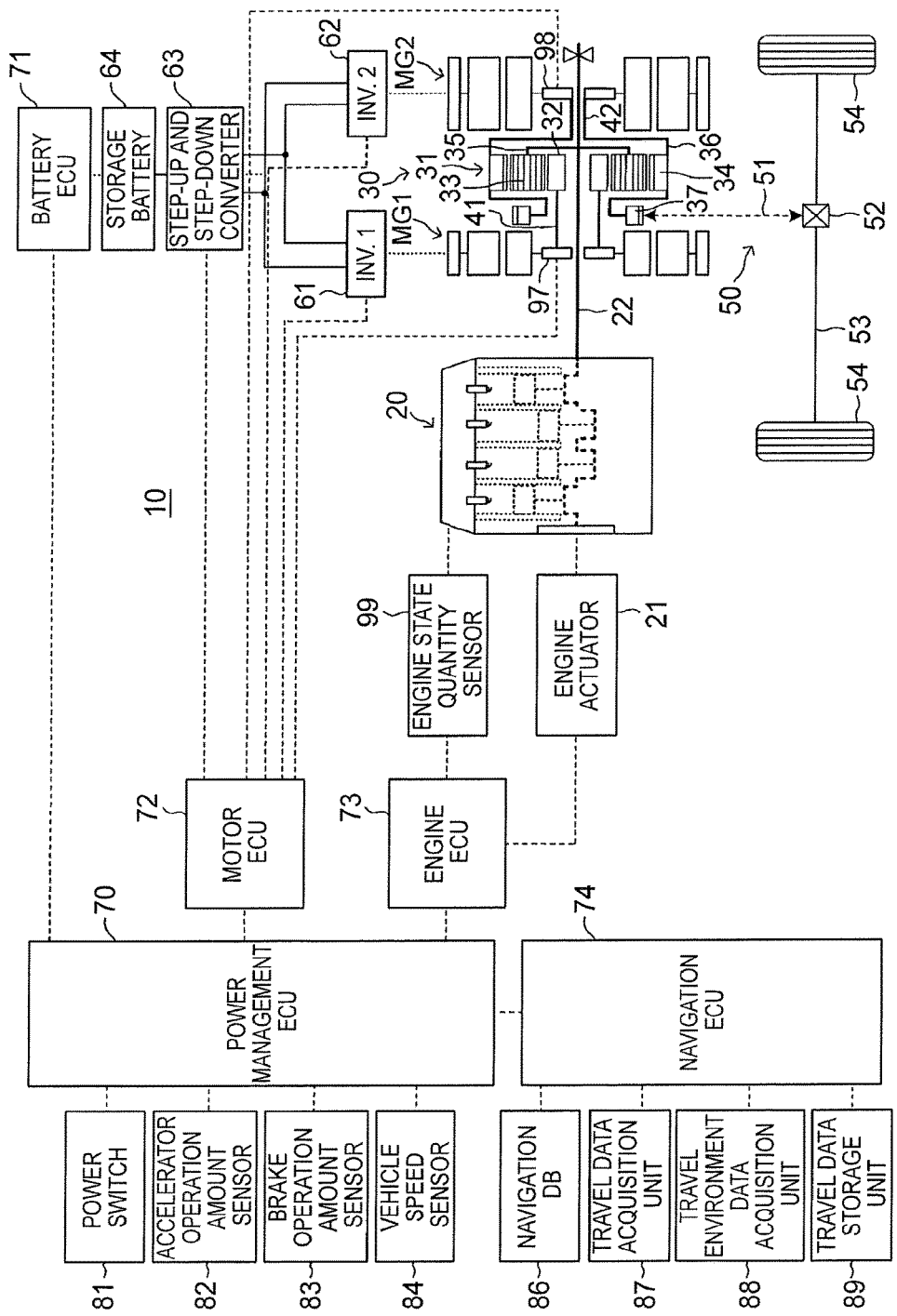
FIG. 1 is a schematic view of a hybrid vehicle, to which a control apparatus for a vehicle according to an embodiment of the present disclosure is applied, and the control apparatus.

A control apparatus (hereinafter, referred to as first apparatus) for a hybrid vehicle according to the first embodiment of the present disclosure is applied to a hybrid vehicle 10 (hereinafter, also simply referred to as vehicle) shown in FIG. 1.

The vehicle 10 includes a first generator motor MG1, a second generator motor MG2, an internal combustion engine 20, a power split mechanism 30, a driving force transmission mechanism 50, a first inverter 61, a second inverter 62, a step-up and step-down converter 63, a storage battery 64, a power management ECU 70, a battery ECU 71, a motor ECU 72, an engine ECU 73, a navigation ECU 74, and the like. These ECUs may be integrated as one ECU, and correspond to a controller according to the present disclosure.

The ECU is an abbreviation of electronic control unit. The ECU is an electronic control circuit including a microcomputer as a main component. The microcomputer includes a CPU, a ROM, a RAM, a backup RAM (or a nonvolatile memory), an interface, and the like.

The first generator motor MG1 is a synchronous generator motor that is able to function as any of a generator and an electric motor. The first generator motor MG1 mainly exercises the function of a generator in the present embodiment. The first generator motor MG1 includes a first shaft 41 that is an output shaft.

The second generator motor MG2, as well as the first generator motor MG1, is a synchronous generator motor that is able to function as any of a generator and an electric motor. The second generator motor MG2 mainly exercises the function of an electric motor in the present embodiment. The second generator motor MG2 includes a second shaft 42 that is an output shaft.

The internal combustion engine (hereinafter, also simply referred to as engine) 20 is a four-cycle spark-ignition multi-cylinder internal combustion engine. The engine 20 includes a known engine actuator 21. For example, the engine actuator 21 includes a fuel supply device including fuel injection valves, an ignition device including ignition plugs, an actuator for changing the opening degree of a throttle valve, a variable intake valve control apparatus (VVT), and the like. The engine 20 is configured to be able to change an intake air amount by changing the opening degree of the throttle valve by the use of the throttle valve actuator, and change the torque and engine rotation speed of the engine 20 (that is, engine output power) by, for example, changing a fuel injection amount in response to the intake air amount. The throttle valve is arranged in an intake passage (not shown). The engine 20 generates torque in a crankshaft 22. The crankshaft 22 is the output shaft of the engine 20.

The power split mechanism 30 includes a known planetary gear unit 31. The planetary gear unit 31 includes a sun gear 32, a plurality of planetary gears 33, and a ring gear 34.

The sun gear 32 is connected to the first shaft 41 of the first generator motor MG1. Therefore, the first generator motor MG1 is able to output torque to the sun gear 32. The first generator motor MG1 is able to generate electric power by being driven to rotate by torque that is input from the sun gear 32 to the first generator motor MG1.

Each of the plurality of planetary gears 33 is in mesh with the sun gear 32 and is also in mesh with the ring gear 34. The rotary shaft (rotation axis) of each planetary gear 33 is provided in a planetary carrier 35. The planetary carrier 35 is supported coaxially with the sun gear 32 so as to be rotatable. The planetary carrier 35 is connected to the crankshaft 22 of the engine 20.

The ring gear 34 is supported coaxially with the sun gear 32 so as to be rotatable.

When torque is input from the planetary gears 33 to the sun gear 32, the sun gear 32 is driven to rotate by the torque. When torque is input from the planetary gears 33 to the ring gear 34, the ring gear 34 is driven to rotate by the torque. On the contrary, when torque is input from the sun gear 32 to the planetary gears 33, the planetary gears 33 are driven to rotate by the torque. When torque is input from the ring gear 34 to the planetary gears 33, the planetary gears 33 are driven to rotate by the torque.

The ring gear 34 is connected to the second shaft 42 of the second generator motor MG2 via a ring gear carrier 36. Therefore, the second generator motor MG2 is able to output torque to the ring gear 34. The second generator motor MG2 is able to generate electric power by being driven to rotate by torque that is input from the ring gear 34 to the second generator motor MG2.

The ring gear 34 is connected to an output gear 37 via the ring gear carrier 36. Therefore, the output gear 37 is driven to rotate by torque that is input from the ring gear 34 to the output gear 37. The ring gear 34 can be driven to rotate by torque that is input from the output gear 37 to the ring gear 34.

The driving force transmission mechanism 50 includes a gear train 51, a differential gear 52 and a drive shaft 53.

The gear train 51 connects the output gear 37 with the differential gear 52 by the use of a gear mechanism such that power is transmittable. The differential gear 52 is connected to the drive shaft 53. Drive wheels 54 are respectively connected to both ends of the drive shaft 53. Therefore, torque from the output gear 37 is transmitted to the drive wheels 54 via the gear train 51, the differential gear 52 and the drive shaft 53. The hybrid vehicle 10 is able to travel by using the torque transmitted to the drive wheels 54.

The first inverter 61 is electrically connected to the first generator motor MG1 and is also electrically connected to the storage battery 64 via the step-up and step-down converter 63. Therefore, when the first generator motor MG1 is generating electric power, electric power generated by the first generator motor MG1 is supplied to the storage battery 64 via the first inverter 61 and the step-up and step-down converter 63. On the contrary, the first generator motor MG1 is driven to rotate by electric power that is supplied from the storage battery 64 via the step-up and step-down converter 63 and the first inverter 61.

The second inverter 62 is electrically connected to the second generator motor MG2 and is also electrically connected to the storage battery 64 via the step-up and step-down converter 63. Therefore, the second generator motor MG2 is driven to rotate by electric power that is supplied from the storage battery 64 via the step-up and step-down converter 63 and the second inverter 62. On the contrary, when the second generator motor MG2 is generating electric power, electric power generated by the second generator motor MG2 is supplied to the storage battery 64 via the second inverter 62 and the step-up and step-down converter 63.

Electric power that is generated by the first generator motor MG1 is allowed to be directly supplied to the second generator motor MG2, and electric power that is generated by the second generator motor MG2 is allowed to be directly supplied to the first generator motor MG1.

The storage battery 64 is electrical storage means that stores electric energy for driving the first generator motor MG1 or the second generator motor MG2. The storage battery 64 is a secondary battery, such as a lithium ion battery, that is able to repeat charging and discharging. An SOC sensor (not shown) is connected to the storage battery 64. The SOC sensor is used to detect the SOC. The battery ECU 71 is able to monitor the SOC of the storage battery 64.

The storage battery 64 should be a chargeable and dischargeable electrical storage device. The storage battery 64 may be not only a lithium ion battery but also a nickel-metal hydride battery, a lead storage battery, a nickel-cadmium battery or another secondary battery.

The power management ECU 70 (hereinafter, also referred to as PM ECU 70) is connected to the battery ECU 71, the motor ECU 72, the engine ECU 73 and the navigation ECU 74 (described later) via controller area network (CAN) communication such that information is exchangeable with each other.

The PM ECU 70 receives output signals from a power switch 81, an accelerator operation amount sensor 82, a brake operation amount sensor 83, a vehicle speed sensor 84, and the like. The power switch 81 is a switch for starting up the system of the hybrid vehicle 10.

The accelerator operation amount sensor 82 generates an output signal indicating the operation amount (hereinafter, referred to as accelerator operation amount AP) of an accelerator pedal (not shown). The accelerator pedal is provided so as to be operable by a driver. The accelerator operation amount AP may also be expressed as accelerating operation amount. The brake operation amount sensor 83 generates an output signal indicating the operation amount BP of a brake pedal (not shown) that is operated by the driver. The vehicle speed sensor 84 generates an output signal indicating the vehicle speed SPD of the hybrid vehicle 10.

The PM ECU 70 receives the remaining amount of charge SOC of the storage battery 64 that is acquired by the battery ECU 71. The remaining amount of charge SOC is calculated by a known technique on the basis of, for example, an integrated value of current flowing from and into the storage battery 64.

The PM ECU 70 receives a signal indicating the rotation speed of the first generator motor MG1 and a signal indicating the rotation speed of the second generator motor MG2 via the motor ECU 72. The signal indicating the rotation speed of the first generator motor MG1 is referred to as MG1 rotation speed Nm1. The signal indicating the rotation speed of the second generator motor MG2 is referred to as MG2 rotation speed Nm2.

The MG1 rotation speed Nm1 is calculated on the basis of an output value of a resolver 97 by the motor ECU 72. The resolver 97 is provided in the first generator motor MG1, and outputs an output value corresponding to the rotation angle of the rotor of the first generator motor MG1. Similarly, the MG2 rotation speed Nm2 is calculated on the basis of an output value of a resolver 98 by the motor ECU 72. The resolver 98 is provided in the second generator motor MG2, and outputs an output value corresponding to the rotation angle of the rotor of the second generator motor MG2.

The PM ECU 70 receives an output signal indicating an engine state via the engine ECU 73. The engine state is detected by an engine state quantity sensor 99. The output signal indicating the engine state includes an engine rotation speed NE, a throttle valve opening degree TA, an engine coolant temperature THW, and the like.

The motor ECU 72 is connected to the first inverter 61, the second inverter 62 and the step-up and step-down converter 63. The motor ECU 72 transmits command signals to the first inverter 61, the second inverter 62 and the step-up and step-down converter 63 on the basis of commands (for example, MG1 command torque Tm1* and MG2 command torque Tm2*) from the PM ECU 70. Thus, the motor ECU 72 controls the first generator motor MG1 by using the first inverter 61 and the step-up and step-down converter 63, and controls the second generator motor MG2 by using the second inverter 62 and the step-up and step-down converter 63.

The engine ECU 73 controls the engine 20 by transmitting a command signal to the engine actuator 21 on the basis of a command from the PM ECU 70 and a signal from the engine state quantity sensor 99.

The navigation ECU (hereinafter, also referred to as NV ECU) 74 is electrically connected to a navigation database 86, a travel data acquisition unit 87, a travel environment data acquisition unit 88, a travel data storage unit 89, and the like.

The navigation database (hereinafter, also referred to as NV DB) 86 stores various data, such as map data, route calculation data, image data, voice data and index data. These data are used to, for example, provide navigation service to the driver (or a passenger), determine (hereinafter, also referred to as plan) the operation schedule of the engine 20 and/or the second generator motor MG2 and determine a target remaining amount of charge of the storage battery 64.

The various data in the NV DB 86 are stored in a storage device, such as a magnetic disk (HDD) and a semiconductor memory.

The map data include road data, guidance data, and the like. The road data include road identification information for determining roads on the map data. The guidance data include intersection names, and the like, that are used for route guidance.

The route calculation data include link information, node information, regulation information, and the like. The link information is information pertaining to road sections of a road network. The node information is information pertaining to intersections of the road network. The regulation information is information pertaining to road regulation. The node information and the link information are utilized in downhill search (searching for a target downhill section), downhill control (described later), and the like. Each link is associated with the gradient data of a road section corresponding to the link and/or the altitude data of points of both ends of the road section corresponding to the link.

The travel data acquisition unit 87 acquires travel data, such as the current position, travel speed, and the like, of the vehicle 10 at predetermined intervals during a period from when the power switch 81 of the vehicle is turned on to when the power switch 81 is turned off. The predetermined intervals mean predetermined time intervals (for example, intervals of 100 msec), predetermined distance intervals (for example, intervals of 100 m), or the like.

The travel data acquisition unit 87 includes a global positioning system (GPS) receiving device. The travel data acquisition unit 87 receives GPS information with the use of the GPS receiving device. The GPS information is transmitted from GPS satellites. The travel data acquisition unit 87 acquires the positional information (latitude and longitude) of the vehicle by analyzing the received GPS information. In this way, the travel data acquisition unit 87 may also be regarded as a positional information acquisition unit that acquires the positional information of the vehicle 10.

The travel environment data acquisition unit 88 acquires date, time, a day of the week, date and time of departure of the vehicle, and route information, and then provides those pieces of data to the NV ECU 74 as the travel environment data. The route information is information pertaining to a travel environment around the vehicle at the time when the vehicle is traveling, and includes, for example, weather information, traffic congestion information, traffic regulation information, road construction information and event information.

More specifically, the travel environment data acquisition unit 88 acquires data and time information, such as current time, date, a day of the week and a date and time of a departure of the vehicle. The travel environment data acquisition unit 88 includes, for example, a device that acquires information from VICS (registered trademark). The information from VICS is transmitted from an optical beacon, a radio wave beacon, an FM broadcasting station, or the like, and includes road information (traffic information), such as traffic congestion information, a required time, traffic accident, disabled vehicle and construction information, speed regulation and lane regulation information, the locations of parking lots and full/vacant information of parking lots. In this way, the travel environment data acquisition unit 88 may also be regarded as a route information acquisition unit that acquires various pieces of information pertaining to the conditions of a route along which the vehicle 10 travels.

The travel data storage unit 89 stores the travel data acquired by the travel data acquisition unit 87 and the travel environment data acquired by the travel environment data acquisition unit 88. In this case, travel data and travel environment data in one travel of the vehicle are stored in association with each other. Thus, the altitudes of points of both ends of a link corresponding to a road on which the vehicle 10 has actually traveled can be learned. An altitude is calculated on the basis of a signal from an atmospheric pressure sensor included in the engine state quantity sensor 99.

Information processing that is executed by the NV ECU 74 includes, for example, route guidance for the driver and generating and providing navigation information that is used by the PM ECU 70 to execute downhill control. In the process of route guidance, the NV ECU 74 searches for a route from a current location to a destination set by the driver, or the like, with the use of user interface, shows the route to the driver, and guides the driver to the destination while acquiring a current position.

Outline of Operation

Next, downhill control that is executed by the PM ECU 70, the NV ECU 74, and the like, of the control apparatus will be described with reference to FIG. 2 and FIG. 3.

1. Outline of Downhill Control

Figure 2:
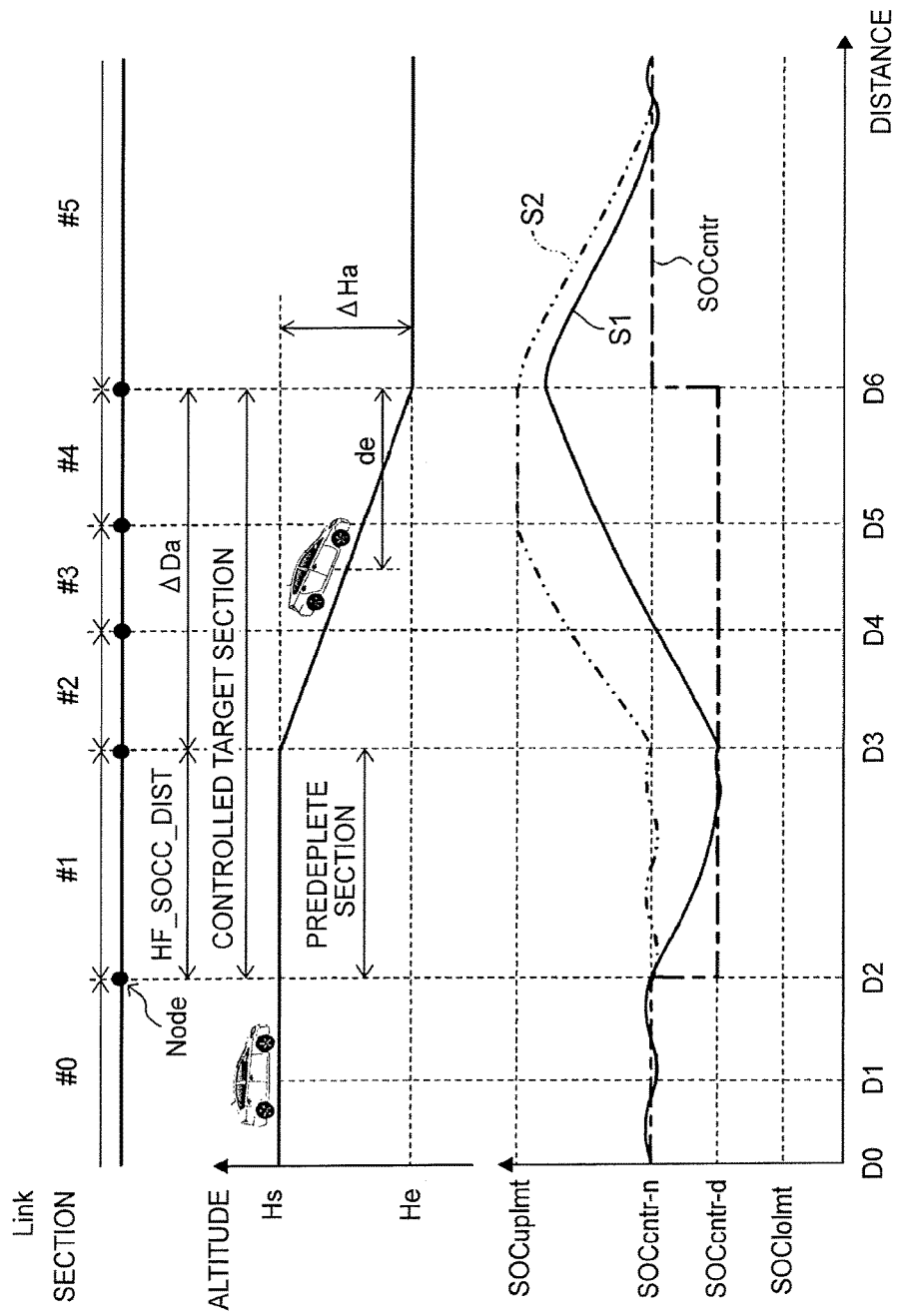
FIG. 2 is a chart that schematically shows changes in battery remaining amount of charge under downhill control that is executed by the control apparatus for a hybrid vehicle, shown in FIG. 1.
Figure 3:
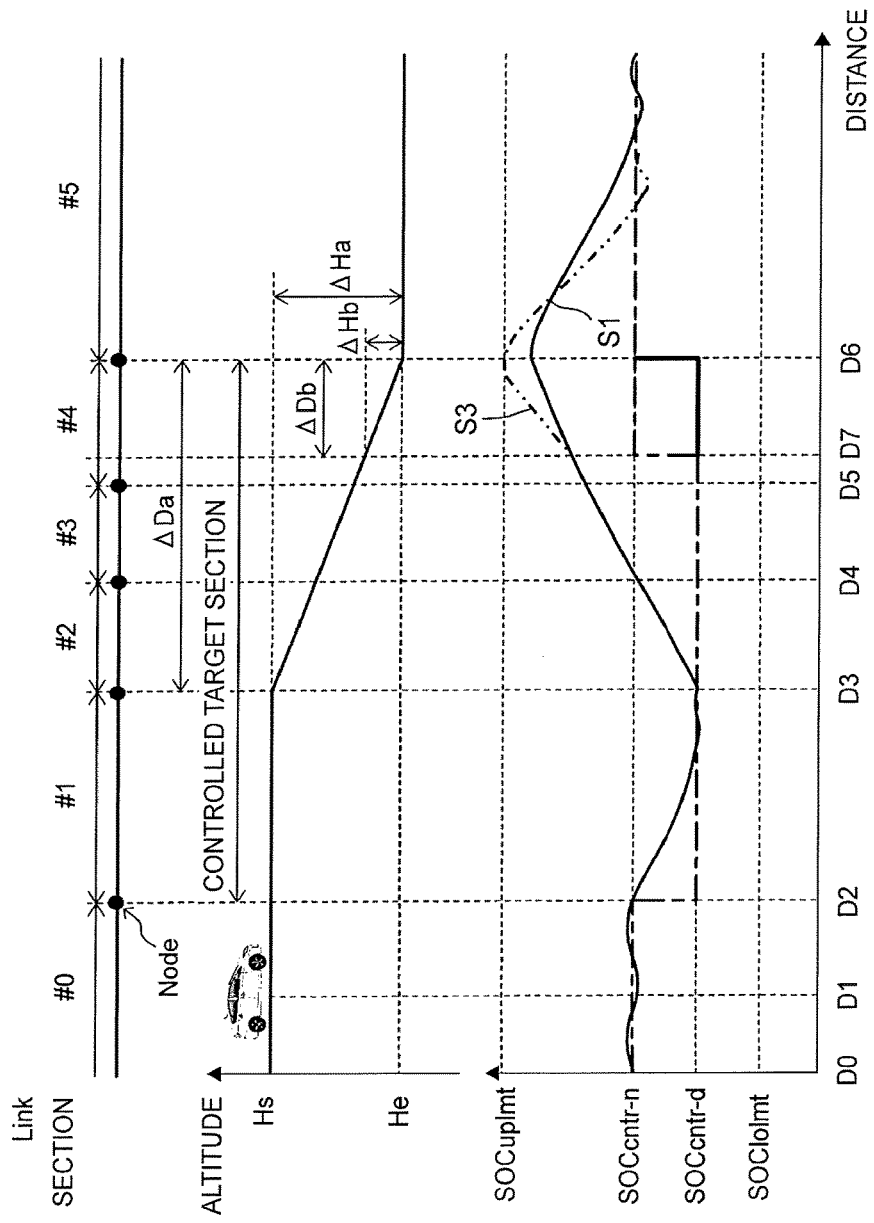
FIG. 3 is a chart that schematically shows changes in battery remaining amount of charge under downhill control that is executed by the control apparatus for a hybrid vehicle, shown in FIG. 1, and changes in battery remaining amount of charge under downhill control that is executed by an existing apparatus.

The abscissa axis of each of FIG. 2 and FIG. 3 represents a point in a scheduled travel route of the vehicle 10 by distance. In the example shown in FIG. 2, the scheduled travel route includes six road sections corresponding to link #0 to link #5. The connection point between adjacent links is a node. The ordinate axis of each of FIG. 2 and FIG. 3 represents the altitude of a road in the scheduled travel route of the vehicle 10 and the SOC of the storage battery 64.

The scheduled travel route shown in FIG. 2 and FIG. 3 includes a downhill that runs from a flat road having an altitude Hs to a flat road having an altitude He (Altitude Hs>Altitude He). The downhill consists of three sections corresponding to link #2 to link #4.

In order to prevent or reduce the progress of degradation of the storage battery 64, the first apparatus sets an upper limit remaining amount of charge SOCuplmt and a lower limit remaining amount of charge SOClolmt, and controls (manages) the remaining amount of charge SOC such that the remaining amount of charge SOC falls within the range (SOC management range) from the upper limit remaining amount of charge SOCuplmt to the lower limit remaining amount of charge SOClolmt.

During ordinary traveling other than during downhill traveling, traffic congestion traveling, and the like, the first apparatus sets the target remaining amount of charge SOCcntr to a normal remaining amount of charge SOCcntr-n. For example, the upper limit remaining amount of charge SOCuplmt is set to a value corresponding to 80% of full charge, the lower limit remaining amount of charge SOClolmt is set to a value corresponding to 40% of full charge, and the normal remaining amount of charge SOCcntr-n is set to a value corresponding to 60% of full charge.

During ordinary traveling, the PM ECU 70 controls the engine 20, the second generator motor MG2 and the first generator motor MG1 such that driving force or braking force or both that are required from the vehicle 10 are satisfied and an actual SOC approaches the normal remaining amount of charge SOCcntr-n. That is, the normal remaining amount of charge SOCcntr-n is the target remaining amount of charge during ordinary traveling. In the example shown in FIG. 2, the SOC of the storage battery 64 at point D0 is controlled to a value near the normal remaining amount of charge SOCcntr-n.

The vehicle 10 during ordinary traveling performs a downhill search at point D1. The downhill search will be described later. In this example, description will be continued on the assumption that three sections corresponding to link #2 to link #4 correspond to a downhill section on which downhill control is executed (hereinafter, may be referred to as target downhill section).

The NV ECU 74 performs a downhill search each time a predetermined time (in this example, five minutes that is a time interval at which VICS information is updated) elapses. Now, it is assumed that the vehicle 10 has reached the point D1 at timing at which a downhill search is performed. At this point in time, the vehicle 10 is performing ordinary traveling and is not executing downhill control.

The NV ECU 74 determines a target downhill section in this downhill search. The target downhill section is a target of downhill control in the scheduled travel route. Specifically, the NV ECU 74 determines a section corresponding to a first link group as a target downhill section on the basis of the information in the NV DB 86. The first link group includes a single or plurality of successive links among a group of links corresponding to the scheduled travel route, and satisfies all the following conditions. However, the following conditions are only illustrative, and the conditions are not limited to these.

(1) Any section corresponding to each link of the first link group falls within a set distance (for example, a radius of 10 km) from the current position of the vehicle 10.

(2) Any section corresponding to each link of the first link group has a down grade lower than a predetermined threshold gradient.

(3) The altitude Hs of the start point of the first link group is higher than the altitude He of the end point of the first link group (Hs>He), and the absolute value of the difference (altitude difference $\Delta Ha = |Hs-He|$) is larger than or equal to a predetermined altitude difference (SOC_STL_H).

(4) A total distance $\Delta Da$ of each section corresponding to the first link group is longer than or equal to a predetermined distance (SOC_STL_D).

In the example shown in FIG. 2, the first link group consisting of link #2 to link #4 satisfies the conditions (1) to (4), so the road sections corresponding to link #2 to link #4 (that is, a section from point D3 to point D6) are determined as a target downhill section. The NV ECU 74 stores a start point Dk (that is, the latitude and longitude of the point D3) of the determined target downhill section and an end point De (that is, the latitude and longitude of the point D6) of the determined target downhill section.

The NV ECU 74 determines point Ds that is located a predetermined first distance (remaining amount of charge adjustment distance (HF_SOCC_DIST)) from the start point (that is, the point D3) of the target downhill section, and provides the latitude and longitude of that point to the PM ECU 70 as the latitude and longitude of the start point Ds of downhill control. The NV ECU 74 may redetermine the point of a node closest to the point Ds and closer to the vehicle 10 than the point Ds as point Ds. In other words, the first distance may be some range of distances. A section from the downhill control start point Ds to the start point Dk (point D3) of the target downhill section may be referred to as predeplete section. In the example shown in FIG. 2, the remaining amount of charge adjustment distance (HF_SOCC_DIST) coincides with the distance of a section corresponding to link #1. A section that is a combination of the predeplete section and the target downhill section is a section on which downhill control is executed, so the section is also referred to as controlled target section (target downhill control section).

The NV ECU 74 transmits the downhill control start point Ds, the start point Dk (that is, the point D3) of the target downhill section and the downhill control end point De (the end point De of the target downhill section, that is, the point D6) to the PM ECU 70 when these points are updated.

The PM ECU 70 (and the battery ECU 71) has been acquiring the current location (current position) of the vehicle 10 from the NV ECU 74 whenever necessary. When the current location coincides with the downhill control start point Ds (that is, when the vehicle 10 reaches point D2 in FIG. 2), the PM ECU 70 (and the battery ECU 71) executes target remaining amount of charge decreasing control that is part of downhill control. More specifically, when the current location coincides with the downhill control start point Ds, the PM ECU 70 (and the battery ECU 71) changes the target remaining amount of charge SOCcntr from the normal remaining amount of charge SOCcntr-n to a downhill control target remaining amount of charge (for the sake of convenience, also referred to as low remaining amount of charge or first remaining amount of charge) SOCcntr-d. Changes in the target remaining amount of charge SOCcntr are indicated by the alternate long and short dashes line in FIG. 2. The downhill control target remaining amount of charge SOCcntr-d is a value smaller than the ordinary target remaining amount of charge SOCcntr-n (60% of full charge), and is set to, for example, 50% of full charge.

The hybrid vehicle 10 also travels in hybrid mode (HV mode). The hybrid mode is a known mode described in, for example, Japanese Patent Application Publication No. 2013-154718 (JP 2013-154718 A), Japanese Patent Application Publication No. 2013-154715 (JP 2013-154715 A), or the like.

In short, the hybrid mode is a drive mode that permits usage of the internal combustion engine 20 in addition to the second generator motor MG2 in causing the vehicle 10 to travel. Specifically, the hybrid mode is a mode in which the second generator motor MG2 is driven, the internal combustion engine 20 is operated at an operating point at which the operation efficiency is maximum and the vehicle 10 is caused to travel while a required torque (required driving force, that is, user required torque) that is required from the vehicle 10 is satisfied by the output power of both second generator motor MG2 and the internal combustion engine 20.

In this drive mode, when the output power that is required from the internal combustion engine 20 is smaller than a threshold (that is, when the internal combustion engine 20 cannot be operated at an optimal operating point), the operation of the internal combustion engine 20 is stopped. On the other hand, when the output power that is required from the internal combustion engine 20 is larger than or equal to the threshold, the internal combustion engine 20 is operated at the optimal operating point such that the required output power is satisfied. As a result, a shortage of torque (driving force) with respect to the required torque is compensated by the use of the second generator motor MG2, while, at the same time, the storage battery 64 is charged by using the output power of the internal combustion engine 20. As the remaining amount of charge SOC decreases with respect to the target remaining amount of charge SOCcntr, the output power that is required from the internal combustion engine 20 to charge the storage battery 64 increases. For this reason, as the remaining amount of charge SOC decreases, the internal combustion engine 20 is more easily operated.

When the remaining amount of charge SOC becomes lower than or equal to the lower limit remaining amount of charge SOClolmt, the internal combustion engine is forcibly operated even if the internal combustion engine 20 cannot be operated at the optimal operating point, and the storage battery 64 is charged with electric power generated by the second generator motor MG2 and the first generator motor MG1 by using the output power of the internal combustion engine 20. That is, forcible charging is performed.

In the predeplete section, the PM ECU 70 decreases the remaining amount of charge SOC by operating the second generator motor MG2 to consume electric power such that the remaining amount of charge SOC approaches the low remaining amount of charge SOCcntr-d (see the continuous line S1 in FIG. 2).

In the example shown in FIG. 2, the remaining amount of charge SOC decreases to the first remaining amount of charge SOCcntr-d by the time the vehicle 10 travels on the predeplete section and reaches the start point D3 of the target downhill section. That is, the above-described remaining amount of charge adjustment distance HF_SOCC_DIST is set as a sufficient distance in order to bring the SOC of the storage battery 64 from the normal remaining amount of charge SOCcntr-n close to the first remaining amount of charge SOCcntr-d by operating the second generator motor MG2 to consume electric power stored in the storage battery 64. The remaining amount of charge adjustment distance HF_SOCC_DIST is set to, for example, about 5 km; however, it may be shorter or longer than 5 km depending on the travel route or travel condition of the vehicle 10.

As the vehicle 10 starts traveling on the target downhill section, regenerative braking using the first generator motor MG1 or the second generator motor MG2 or both is frequently performed. As a result, electric power generated through regenerative braking (regenerative energy) is supplied to the storage battery 64, so the remaining amount of charge SOC gradually increases. In other words, the NV ECU 74 determines the following downhill as the target downhill section. The downhill is such that regenerative energy exceeds energy that is used for propelling the vehicle 10 and, as a result, the remaining amount of charge SOC increases.

When the current location of the vehicle 10 coincides with the downhill control end point De (that is, when the vehicle 10 reaches the point D6 in FIG. 2), the PM ECU 70 (and the battery ECU 71) ends downhill control (in this example, target remaining amount of charge decreasing control). More specifically, the PM ECU 70 (and the battery ECU 71) changes (returns) the target remaining amount of charge SOCcntr from the first remaining amount of charge SOCcntr-d to the normal remaining amount of charge SOCcntr-n. After that, the vehicle 10 travels on a flat road (section corresponding to link #5). Therefore, the remaining amount of charge SOC gradually approaches the normal remaining amount of charge SOCcntr-n. The NV ECU 74 may provide notification to the PM ECU 70 that the current location of the vehicle has reached the point Ds, Dk or De, and the PM ECU 70 may start or end downhill control in accordance with the notification.

When downhill control is not executed by the control apparatus, the actual remaining amount of charge SOC changes as indicated by the alternate long and two-short dashes line S2 in FIG. 2. In this case, the remaining amount of charge SOC reaches the upper limit remaining amount of charge SOCuplmt while the vehicle 10 is traveling on the target downhill section. For this reason, the PM ECU 70 stops supplying electric power energy that is generated through regenerative braking (regenerative energy) to the storage battery 64 such that the remaining amount of charge SOC does not exceed the upper limit remaining amount of charge SOCuplmt. Therefore, in this case, regenerative energy that is not recovered is converted to thermal energy, or the like, and is consumed.

2. Handling in the Case where a Section (Controlled Target Section) on which Downhill Control is Executed while the Vehicle is Traveling on the Target Downhill Section (while Downhill Control is being Executed) is Updated.

For example, as shown in FIG. 3, as the update timing (for example, the timing at which VICS information is updated) of the scheduled travel route and downhill search comes when the vehicle 10 is traveling at point D7 that is halfway in the target downhill section, the NV ECU 74 determines a scheduled travel route and performs a downhill search again. That is, the NV ECU 74 searches for and determines a new target downhill section (updates the target downhill section).

As described above, in order for the section corresponding to the first link group in the scheduled travel route to be determined as the target downhill section, the above-described conditions (1) to (4) need to be satisfied. However, for example, the distance from the point D7 to the point D6 is short, so a total distance ΔDb is shorter than the predetermined distance (SOC_STL_D). Alternatively, the altitude difference ΔHa between the point D7 and the point D6 is smaller than the predetermined altitude difference (SOC_STL_H). Therefore, the NV ECU 74 does not determine the section from the point D7 to the point D6 as a target downhill section.

As a result, the current position of the vehicle 10 is no longer the position at which downhill control is executed, so the NV ECU 74 transmits a command to the PM ECU 70 to end downhill control. Therefore, the PM ECU 70 (and the battery ECU 71) ends downhill control. Specifically, the PM ECU 70 (and the battery ECU 71) stops target remaining amount of charge decreasing control, so the target remaining amount of charge SOCcntr is returned to the normal remaining amount of charge SOCcntr-n.

As a result, originally, although the vehicle 10 could have traveled by consuming the electric energy of the storage battery 64 while the internal combustion engine 20 is not operated and the remaining amount of charge SOC does not reach the upper limit remaining amount of charge SOCuplmt as indicated by the continuous line S1 in FIG. 3, the degree of increase in the remaining amount of charge SOC actually increases and, as a result, the remaining amount of charge SOC may reach the upper limit remaining amount of charge SOCuplmt as indicated by the alternate long and two-short dashes line S3.

More specifically, this event will be described with reference to a change in the required battery charging output power Pb*. The PM ECU 70 calculates a required engine output power Pe* in order to control the vehicle 10 in hybrid mode (described later). The PM ECU 70 calculates the sum of a required vehicle output power Pv*, the required battery charging output power Pb* and a loss (set value) Ploss as the required engine output power Pe* (Pe*=Pv*+Pb*+Ploss).

The PM ECU 70 acquires the required battery charging output power Pb* on the basis of the remaining amount of charge SOC, the remaining amount of charge center value SOCcntr and a lookup table MapPb*(SOC−SOCcntr) (described later).

Figure 4A:
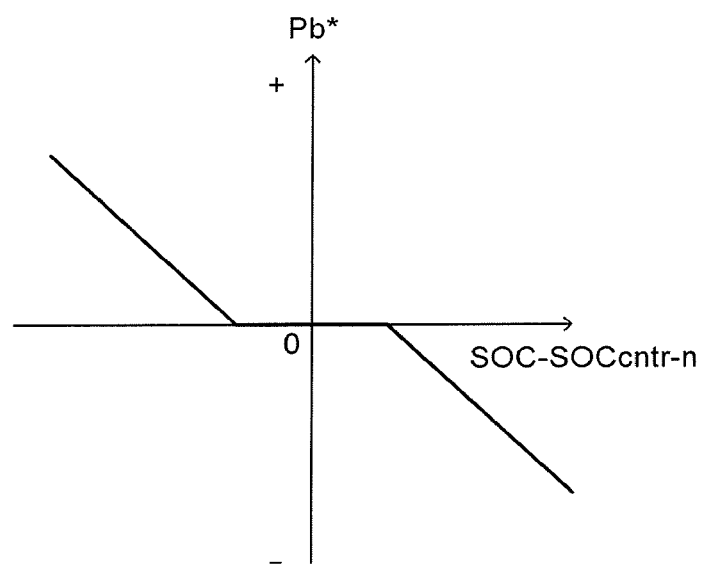
Figure 4B:
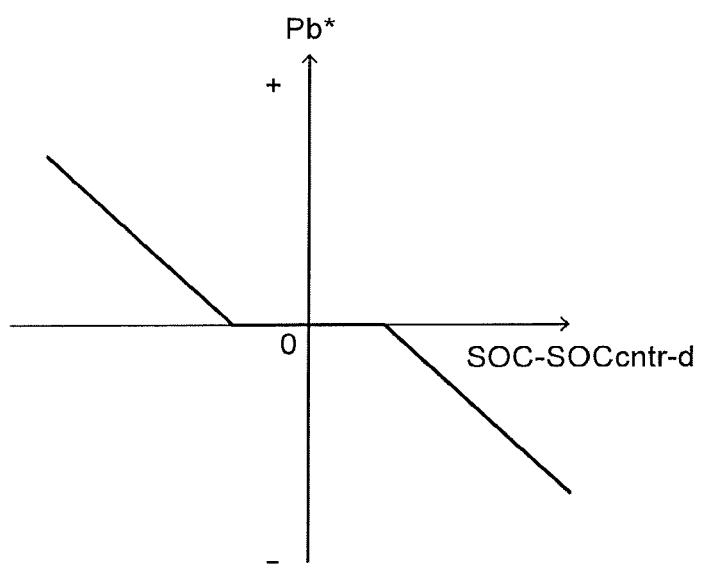

(SOC−SOCcntr) that is the abscissa axis of this table is a difference between an actual remaining amount of charge SOC and a remaining amount of charge center value SOCcntr. During downhill control, the first apparatus changes the remaining amount of charge center value SOCcntr from the ordinary target remaining amount of charge (normal remaining amount of charge) SOCcntr-n to the low remaining amount of charge SOCcntr-d. As shown in FIG. 4A and FIG. 4B, the first apparatus includes two types of tables, that is, the lookup table Map Pb*(SOC−SOCcntr-n) (FIG. 4A) that is consulted during ordinary time and the lookup table MapPb*(SOC−SOCcntr-d) (FIG. 4B) that is consulted during downhill control.

According to the table shown in FIG. 4A, when the difference (=SOC−SOCcntr-n) between the current remaining amount of charge SOC and the target remaining amount of charge (normal remaining amount of charge) SOCcntr-n is a positive value (that is, when SOC>SOCcntr-n), the required charging output power Pb* becomes a negative value, so the required charging output power Pb* is determined such that the absolute value of the required charging output power Pb* increases as the absolute value of the difference (=SOC−SOCcntr-n) increases. On the other hand, when the difference (=SOC−SOCcntr-n) is a negative value (that is, when SOC<SOCcntr-n), the required charging output power Pb* becomes a positive value, and the required charging output power Pb* is determined such that the required charging output power Pb* increases as the difference (=SOC−SOCcntr-n) increases. On the other hand, the table shown in FIG. 4B is the same as the table shown in FIG. 4A except that the abscissa axis is different from the abscissa axis of FIG. 4A.

Figure 5:
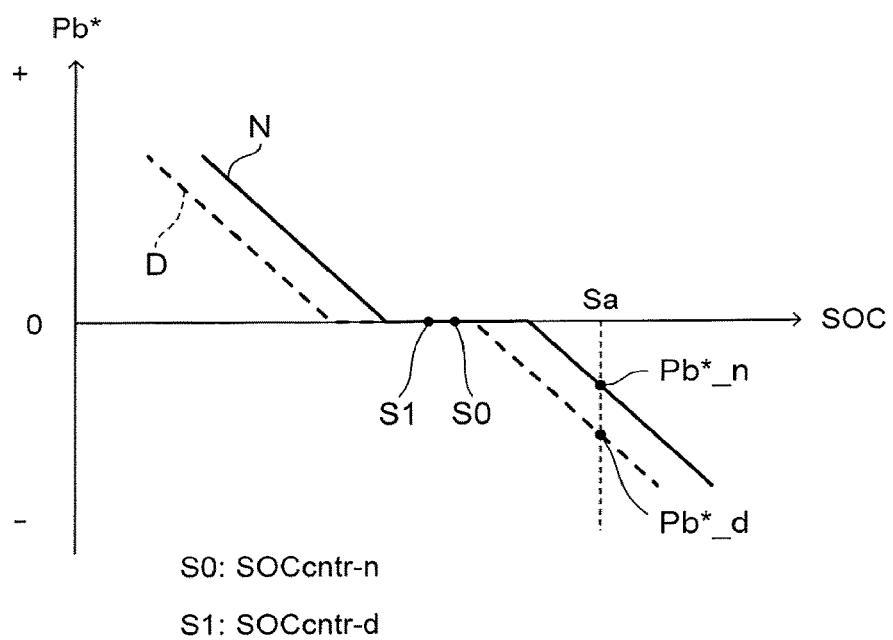
FIG. 5 is a graph that shows the relationship between the remaining amount of charge of a storage battery and a required battery charging output power under downhill control that is executed by the control apparatus for a hybrid vehicle shown in FIG. 1.

FIG. 5 shows the relationship between the two lookup tables. In FIG. 5, the abscissa axis represents the remaining amount of charge SOC, and the ordinate axis represents the required battery charging output power Pb*. The continuous line N corresponds to the table MapPb*(SOC−SOCcntr-n) that is consulted during ordinary time, and the dashed line D corresponds to the table MapPb*(SOC−SOCcntr-d) that is consulted during downhill control. Point S0 and point S1 on the abscissa axis respectively indicate the normal remaining amount of charge SOCcntr-n and the low remaining amount of charge SOCcntr-d.

For example, when the remaining amount of charge SOC is Sa that is larger than the point S0 and the point S1, the required battery charging output power Pb*_d during downhill control is smaller than the required battery charging output power Pb*_n during ordinary time (larger in the negative direction). Therefore, the required engine output power Pe* is smaller during downhill control than during ordinary time.

Therefore, an opportunity to operate the engine 20 reduces during downhill control as compared to during ordinary time, so consumption, that is, the amount of discharge, of the electric motor MG2 is large. Therefore, the rate of increase in remaining amount of charge SOC to a travel distance is gentler during downhill control than during ordinary time. Therefore, if downhill control is ended at the point D7, there is a possibility that an opportunity to operate the engine 20 increases and the fuel consumption of the vehicle 10 deteriorates as compared to when downhill control is continued in a period from the point D7 to the point D6 (when downhill control is executed up to the end point (point D6) of the target downhill section of the controlled target section for which the currently running downhill control is started).

Even when the update timing of the scheduled travel route and/or downhill search comes while the vehicle 10 is traveling on the target downhill section (in other words, during execution of downhill control) and the NV ECU 74 attempts to update the controlled target section by determining a scheduled travel route and/or performing a downhill search again, the first apparatus continues downhill control until the vehicle 10 passes through the end point (point D6) of the target downhill section of the controlled target section for which the currently running downhill control is started.

However, for example, when a destination change command (scheduled travel route search command) has been issued by the driver, when the vehicle 10 departs from the scheduled travel route and a route change is required, or when a route change has been made due to traffic regulation (these are collectively referred to as rerouting), the first apparatus does not continue downhill control, and immediately ends downhill control. Even when the destination has been changed, but when the route of the controlled target section is not changed, the first apparatus may continue downhill control until the end point of the controlled target section.

Actual Operation

Next, the actual operation of the first apparatus will be described.

Determination of Support Plan

Figure 6:
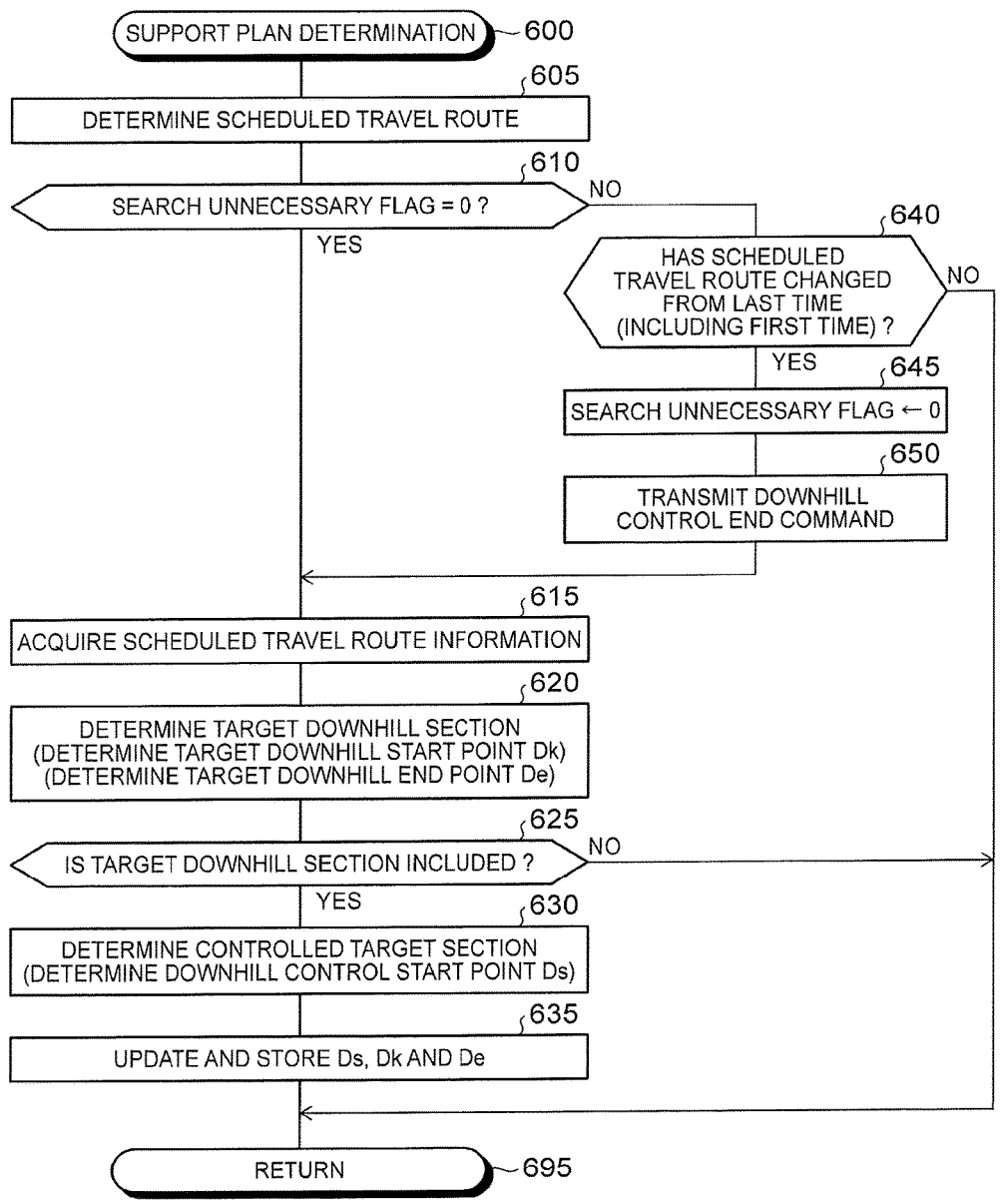
FIG. 6 is a flowchart that shows a support plan determination routine that is executed by a CPU of a navigation ECU (NV ECU) of the hybrid vehicle shown in FIG. 1.

The NV ECU 74 (actually, the CPU) executes a support plan determination routine shown by the flowchart in FIG. 6 each time a set time (for example, five minutes that is an interval at which VICS information is updated) elapses. Therefore, the NV ECU 74 starts the process from step 600 at predetermined timing, proceeds to step 605, acquires the current position of the vehicle 10, a destination, latest road information, and the like, and determines the scheduled travel route of the vehicle 10 on the basis of those pieces of information and the map information stored in the NV DB 86.

Subsequently, the NV ECU 74 proceeds to step 610, and determines whether the value of a downhill search unnecessary flag (hereinafter, also referred to as search unnecessary flag) is "0". The value of the search unnecessary flag is set to "0" in an initial routine (not shown) that is executed at the time when the operation of the vehicle 10 is started. In addition, the value of the search unnecessary flag is set in a search unnecessary flag determination routine (described later).

Now, it is assumed that the value of the search unnecessary flag is "0" In this case, the NV ECU 74 makes affirmative determination in step 610, proceeds to step 615, and acquires information (gradient information, altitude information, and the like) pertaining to a group of links (a group of road sections) that constitute the scheduled travel route and that are located within the range of about 10 km from the current position of the vehicle 10. The NV ECU 74 searches for a first link group that satisfies the above-described conditions (1) to (4) from among the group of links (the group of road sections) that constitute the scheduled travel route, and, when there is such a first link group, determines the first link group. That is, the NV ECU 74 determines a target downhill section. More specifically, when there is a target downhill section, the NV ECU 74 determines the start point Dk and end point De of the target downhill section. When there are a plurality of target downhill sections in the scheduled travel route, the NV ECU 74 employs the start point Dk and end point De of the target downhill section closest to the vehicle 10.

Subsequently, the NV ECU 74 proceeds to step 620, and determines whether the target downhill section is included in the scheduled travel route. When no target downhill section is included in the scheduled travel route, the NV ECU 74 makes negative determination in step 620, directly proceeds to step 695, and once ends the routine. Therefore, in this case, downhill control is not executed.

In contrast, when the target downhill section is included in the scheduled travel route, the NV ECU 74 makes affirmative determination in step 620, proceeds to step 625, and determines a controlled target section (a section on which downhill control should be executed). More specifically, the NV ECU 74 determines a point that is located the first distance (remaining amount of charge adjustment distance (HF_SOCC_DIST)) before the start point Dk of the target downhill section as the downhill control start point Ds. The end point of the controlled target section is the end point De of the target downhill section.

Subsequently, the NV ECU 74 proceeds to step 630, stores the points Ds, Dk and De in its own RAM, and also transmits the points Ds, Dk and De to the PM ECU 70. After that, the NV ECU 74 proceeds to step 695, and once ends the routine. When information about the points Ds, Dk and De is transmitted from the NV ECU 74 to the PM ECU 70, the PM ECU 70 stores those pieces of information in the RAM of the PM ECU 70.

On the other hand, when the value of the search unnecessary flag is "1", the NV ECU 74 makes negative determination in step 610, proceeds to step 640, and determines whether the scheduled travel route determined in step 605 has changed from the scheduled travel route determined at the time when the routine was executed last time (that is, whether rerouting has been performed). At this time, when the scheduled travel route has been changed, the NV ECU 74 makes affirmative determination in step 640, proceeds to step 645, sets the value of the search unnecessary flag to "0", further proceeds to step 650, and transmits a signal to the PM ECU 70 as a command to complete downhill control. When the routine is executed for the first time after the power switch 81 has been changed from the off state to the on state, the NV ECU 74 makes affirmative determination in step 640, and proceeds to step 645 and step 650. As the NV ECU 74 executes the process of step 650, the NV ECU 74 executes the process from step 615. As a result, a new target downhill section and a new controlled target section are determined.

In contrast, when the scheduled travel route determined in step 605 has not changed from the scheduled travel route determined at the time when the routine was executed last time, the NV ECU 74 makes negative determination in step

640, directly proceeds to step 695, and once ends the routine. In this case, a target downhill section or a controlled target section is not newly determined (that is, not updated).

Downhill Control

Figure 7:
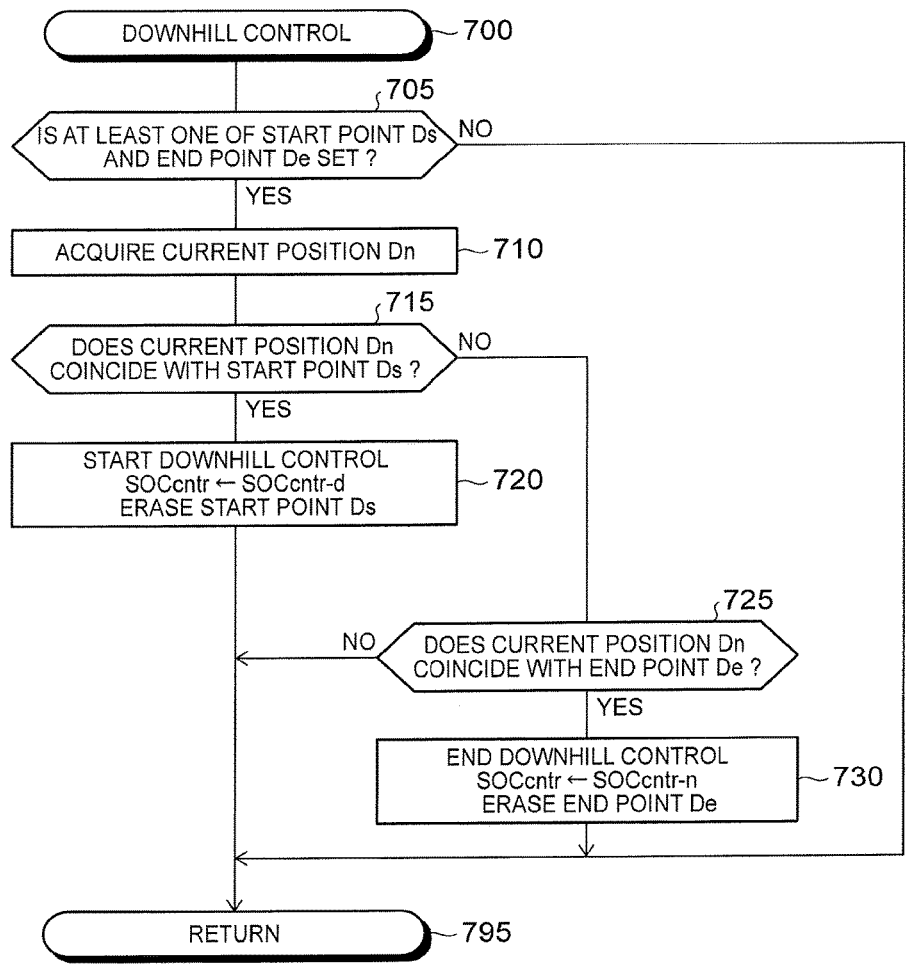
FIG. 7 is a flowchart that shows a downhill control routine that is executed by the CPU of the PM ECU of the hybrid vehicle shown in FIG. 1.

The PM ECU 70 (actually, the CPU) executes a downhill control routine shown by the flowchart in FIG. 7 for executing downhill control each time a predetermined time elapses. Therefore, at adequate timing, the PM ECU 70 starts the process from step 700 in FIG. 7, proceeds to step 705, and determines whether at least one of the start point Ds and end point De of the downhill control section is stored in the RAM of the PM ECU 70.

When at least one of the start point Ds and the end point De is set, the PM ECU 70 makes affirmative determination in step 705, proceeds to step 710, and receives the current position Dn acquired by the GPS receiving device (travel data acquisition unit 87) from the NV ECU 74 via communication. Subsequently, the PM ECU 70 proceeds to step 715, and determines whether the current position Dn coincides with the start point Ds.

When the current position Dn coincides with the start point Ds (actually, within the range of plus and minus several tens of meters with respect to the start point Ds), the PM ECU 70 makes affirmative determination in step 715, proceeds to step 720, and starts downhill control. At this time, the PM ECU 70 changes the target remaining amount of charge SOCcntr to the low remaining amount of charge SOCcntr-d lower than the normal remaining amount of charge SOCcntr-n. In addition, the PM ECU 70 erases the data of the start point Ds from the RAM. Subsequently, the PM ECU 70 proceeds to step 795, and once ends the routine.

On the other hand, when the current position Dn does not coincide with the start point Ds (including the case where the start point Ds has been erased), the PM ECU 70 makes negative determination in step 715, proceeds to step 725, and determines whether the current position Dn coincides with the end point De.

When the current position Dn does not coincide with the end point De, the PM ECU 70 makes negative determination in step 725, directly proceeds to step 795, and once ends the routine. In contrast, when the current position Dn coincides with the end point De, the PM ECU 70 makes affirmative determination in step 725, proceeds to step 730, and ends downhill control. That is, the PM ECU 70 changes the target remaining amount of charge SOCcntr to the normal remaining amount of charge SOCcntr-n. In addition, the PM ECU 70 erases the data of the end point De (and the start point Dk of the target downhill section) from the RAM. Subsequently, the PM ECU 70 directly proceeds to step 795, and once ends the routine.

When neither the start point Ds nor the end point De is set, the PM ECU 70 makes negative determination in step 705, directly proceeds to step 795, and once ends the routine.

Determination of Search Unnecessary Flag

Figure 8:
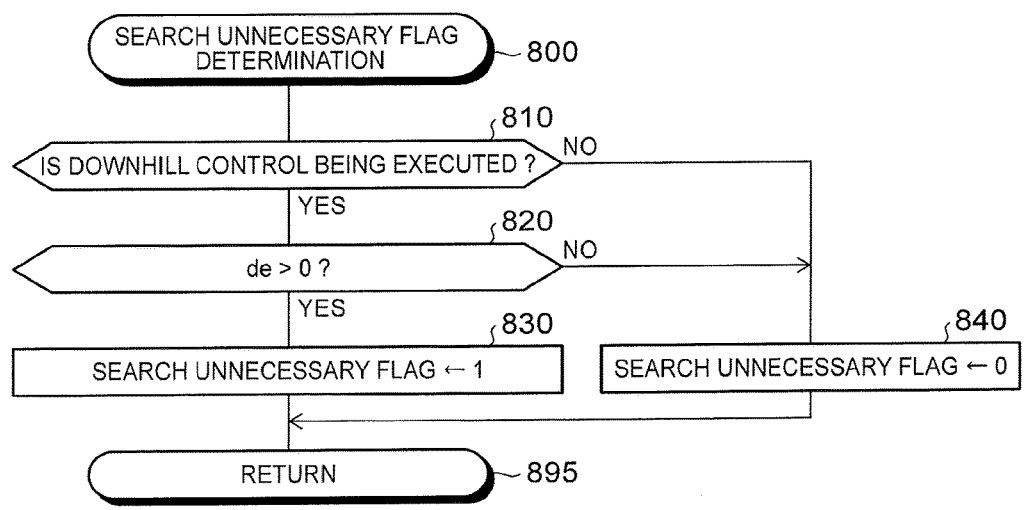
FIG. 8 is a flowchart that shows a search unnecessary flag determination routine that is executed by the CPU of the NV ECU of the hybrid vehicle shown in FIG. 1.

The NV ECU 74 (actually, the CPU) executes a search unnecessary flag determination routine shown by the flowchart in FIG. 8 each time a sufficiently short predetermined time (for example, 1 s) elapses. Therefore, the NV ECU 74 starts the process from step 800 at predetermined timing, proceeds to step 810, and determines whether downhill control shown in step 720 of FIG. 7 is being executed at the current point in time. That is, the NV ECU 74 determines whether it is a stage in which a signal is transmitted to the PM ECU 70 as a command to start downhill control and then a signal is not transmitted to the PM ECU 70 as a command to complete downhill control.

When downhill control is being executed, the NV ECU 74 makes affirmative determination in step 810, proceeds to step 820, and determines whether a distance de (hereinafter, referred to as remaining distance) between the current position of the vehicle 10 and the end point De of the controlled target section (the end point De of the target downhill section), which is separately calculated in a routine (not shown), is a positive value. When the remaining distance de is a positive value (in other words, when the vehicle 10 has not traveled to the end point De of the controlled target section of the currently running downhill control), the NV ECU 74 makes affirmative determination in step 820, proceeds to step 830, sets the value of the search unnecessary flag to "1", proceeds to step 895, and once ends the routine. In contrast, as the remaining distance de becomes zero, the NV ECU 74 makes negative determination in step 820, proceeds to step 840, sets the value of the search unnecessary flag to "0", proceeds to step 895, and once ends the routine. As a result, the value of the search unnecessary flag is kept at "1" until the vehicle 10 reaches the end point of the controlled target section for which the currently running downhill control is started.

Vehicle Traveling Control

Figure 9:
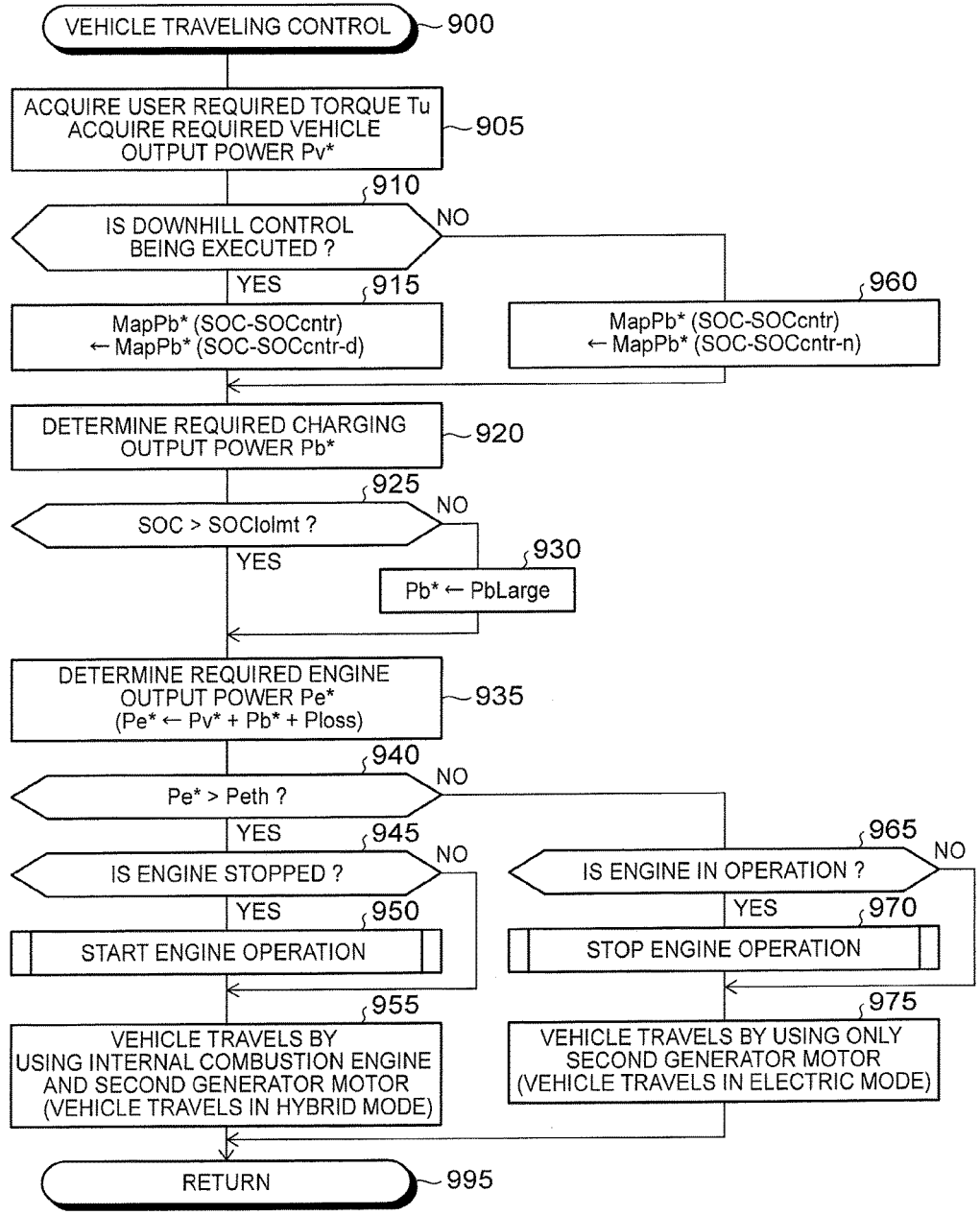
FIG. 9 is a flowchart that shows a vehicle traveling control routine that is executed by the CPU of the PM ECU of the hybrid vehicle shown in FIG. 1.

The PM ECU 70 (actually, the CPU) executes a vehicle traveling control routine shown by the flowchart in FIG. 9 each time a sufficiently short predetermined time (for example, 8 msec) elapses. Therefore, the PM ECU 70 starts the process from step 900 at predetermined timing, proceeds to step 905, acquires a user required torque Tu on the basis of the accelerator operation amount AP and the vehicle speed SPD, and acquires a required vehicle output power Pv* (user required output power Pu*) by multiplying the user required torque Tu by the vehicle speed SPD.

Subsequently, the PM ECU 70 proceeds to step 910, and determines whether downhill control is being executed. When downhill control is being executed in accordance with the downhill control routine shown in FIG. 7, the PM ECU 70 makes affirmative determination in step 910, proceeds to step 915, and sets the lookup table MapPb*(SOC−SOCcntr-d) shown in FIG. 4B as a lookup table for determining a required battery charging output power Pb* (described later).

Subsequently, the PM ECU 70 proceeds to step 920, and determines the required battery charging output power Pb* on the basis of the remaining amount of charge SOC, the low remaining amount of charge SOCcntr-d and the lookup table MapPb*(SOC−SOCcntr-d) set in step 915.

In contrast, when downhill control is not being executed, the PM ECU 70 makes negative determination in step 910, proceeds to step 960, and sets the lookup table MapPb*(SOC−SOCcntr-n) shown in FIG. 4A as the lookup table for determining the required battery charging output power Pb*. After that, the PM ECU 70 proceeds to step 920, and determines the required battery charging output power Pb* on the basis of the remaining amount of charge SOC, the normal remaining amount of charge SOCcntr-n and the lookup table MapPb*(SOC−SOCcntr-n) set in step 960.

When the actual remaining amount of charge SOC is higher than the target remaining amount of charge SOCcntr, the required battery charging output power Pb* indicates a negative value. On the other hand, the normal remaining amount of charge SOCcntr-n is a value higher than the low remaining amount of charge SOCcntr-d. Thus, when the remaining amount of charge SOC is a predetermined (selected) value, the required battery charging output power Pb* decreases by a larger amount when the target remaining amount of charge SOCcntr is set to the low remaining amount of charge SOCcntr-d. That is, the required charging output power Pb* is smaller when downhill control is being executed than when downhill control is not being executed. As a result, when downhill control is being executed, the engine 20 is more difficult to be operated. In other words, the engine 20 is more easily operated when downhill control is not being executed than when downhill control is being executed.

Subsequently, the PM ECU 70 proceeds to step 925, and determines whether the remaining amount of charge SOC is higher than the lower limit remaining amount of charge SOClolmt. When the remaining amount of charge SOC is higher than the lower limit remaining amount of charge SOClolmt, the PM ECU 70 makes affirmative determination in step 925, and directly proceeds to step 935. In contrast, when the remaining amount of charge SOC is lower than or equal to the lower limit remaining amount of charge SOClolmt, the PM ECU 70 makes negative determination in step 925, proceeds to step 930, sets an extremely large value (a value larger than an engine start threshold Peth (described later)) for the required charging output power Pb*, and then proceeds to step 935.

In step 935, the PM ECU 70 calculates the sum of the required vehicle output power Pv*, the required charging output power Pb* and a loss (set value) Ploss as required engine output power Pe*.

Subsequently, the PM ECU 70 proceeds to step 940, and determines whether the required engine output power Pe* is larger than the engine start threshold Peth. The engine start threshold Peth is set to a value at which the internal combustion engine 20 is operated at an operation efficiency higher than a predetermined operation efficiency.

When the required engine output power Pe* is larger than the engine start threshold Peth, the PM ECU 70 makes affirmative determination in step 940, proceeds to step 945, and determines whether the engine is stopped (the operation of the internal combustion engine 20 is stopped). When the engine is stopped, the PM ECU 70 proceeds to step 950, starts the internal combustion engine 20, and proceeds to step 955. In contrast, when the engine is not stopped, the PM ECU 70 directly proceeds from step 945 to step 955. In step 955, the PM ECU 70 controls the internal combustion engine 20 and the second generator motor MG2 (actually, the first generator motor MG1 as well) in accordance with a known technique, and causes the vehicle 10 to travel by using output power from both the internal combustion engine 20 and the second generator motor MG2. That is, the vehicle 10 travels in hybrid mode.

On the other hand, when the required engine output power Pe* is smaller than or equal to the engine start threshold Peth, the PM ECU 70 makes negative determination in step 940, proceeds to step 965, and determines whether the engine is in operation (the internal combustion engine 20 is in operation). When the engine is in operation, the PM ECU 70 proceeds to step 970, stops the operation of the internal combustion engine 20, and proceeds to step 975. In contrast, when the engine is not in operation, the PM ECU 70 directly proceeds from step 965 to step 975. In step 975, the PM ECU 70 controls the second generator motor MG2 in accordance with a known technique, and causes the vehicle 10 to travel by using only the output power of the second generator motor MG2. That is, the vehicle 10 travels in motor mode (electric mode).

The above driving force control is known, and is described in detail in, for example, Japanese Patent Application Publication No. 2009-126450 (JP 2009-126450 A) (US 2010/0241297 A), Japanese Patent Application Publication No. 9-308012 (JP 9-308012 A) (U.S. Pat. No. 6,131,680 filed in United States on Mar. 10, 1997), Japanese Patent Application Publication No. 2013-154720 (JP 2013-154720 A), JP 2013-154718 A, JP 2013-154715 A, or the like.

Regenerative Braking Control

When the accelerator (accelerator pedal) operation amount AP is zero, the PM ECU 70 determines required braking force that is required from the vehicle 10 on the basis of the operation amount BP of the brake pedal by executing a routine (not shown). The PM ECU 70 distributes the required braking force between required regenerative braking force and required friction braking force, controls the second generator motor MG2 such that the required regenerative braking force is generated through regenerative braking, and controls a hydraulic brake actuator (not shown) such that the required friction braking force is generated by a friction brake device (not shown). The PM ECU 70 determines the required regenerative braking force such that the required regenerative braking force increases as much as possible within the range in which the remaining amount of charge SOC does not exceed the upper limit remaining amount of charge SOCuplmt.

As described above, when a controlled target section is newly determined (in any one of a case where the timing of updating the controlled target section comes and a case where the controlled target section is actually updated) during execution of downhill control (that is, before the hybrid vehicle 10 passes through the end point De of the controlled target section on which the downhill control should be executed), the first apparatus continues to execute downhill control until the hybrid vehicle 10 passes through the end point De. As a result, it is possible to sufficiently exercise the effect of improvement in fuel consumption, which is expected as a result of downhill control, so it is possible to improve the fuel consumption performance of the vehicle 10.

Second Embodiment

A control apparatus (hereinafter, referred to as second apparatus) for a hybrid vehicle according to a second embodiment of the present disclosure differs from the first apparatus only in that the NV ECU 74 (actually, the CPU) immediately executes the routine shown in FIG. 6 not only each time a predetermined time elapses but also at a point in time at which the vehicle 10 has passed through the end point De of the controlled target section (the end point of the target downhill section).

That is, a controller of the second apparatus immediately starts the process of the routine shown in FIG. 6 at the point in time at which the vehicle 10 has passed through the end point De of the controlled target section for which downhill control is started (including timing just after that point in time), and newly determines a controlled target section. Therefore, even when a downhill section that can be the controlled target section subsequent to the end point De of the controlled target section appears within a relatively short distance, it is possible to determine the new downhill section as the controlled target section with higher probability. As a result, it is possible to further improve the fuel consumption performance of the vehicle.

As described above, the control apparatuses according to the embodiments of the present disclosure further reliably provide the effect of improvement in fuel consumption resulting from downhill control. The present disclosure is not limited to the above-described embodiments; various alternative embodiments may be employed within the scope of the present disclosure. Such alternative embodiments will be listed below.

(1) The NV ECU 74 may execute the routine shown in FIG. 6 each time the vehicle 10 travels a predetermined distance.

(2) The PM ECU 70 may execute part or all of the routine shown in FIG. 6. In this case, the PM ECU 70 should acquire required information from the NV ECU 74. In addition, when the PM ECU 70 executes the process from step 610 in the routine of FIG. 6, the NV ECU 74 does not need to transmit a signal to the PM ECU 70 as a command to start and end downhill control.

(3) In the above-described embodiments, it is determined whether a traffic congestion section is included in the scheduled travel route on the basis of road information, and, when it is determined that a traffic congestion section is included in the scheduled travel route, control (traffic congestion control) for increasing the actual remaining amount of charge SOC by increasing the target remaining amount of charge SOCcntr in a section just before the traffic congestion section may be executed in addition to downhill control.

(4) The PM ECU 70 or the NV ECU 74 may detect passage of the vehicle 10 through the end point De of the controlled target section of downhill control when the gradient of a road becomes smaller than a predetermined gradient.

(5) The PM ECU 70 or the NV ECU 74 may search for a target downhill section and a controlled target section during execution of downhill control. However, in this case as well, when the vehicle 10 is scheduled to travel continuously on the controlled target section for which downhill control is started, downhill control is continued until the vehicle 10 reaches the end point De of the controlled target section of downhill control.

(6) When the scheduled travel route has changed or road information has been updated, the PM ECU 70 or the NV ECU 74 may search for a target downhill section and a controlled target section. In addition, the PM ECU 70 or the NV ECU 74 may search for a target downhill section and a controlled target section each time a predetermined time elapses or each time the vehicle 10 travels a predetermined distance.

(7) When a command to determine a scheduled travel route has been newly issued by the driver, when the vehicle 10 departs from the scheduled travel route or when road information has been newly received or updated, the NV ECU 74 may determine (search for) a scheduled travel route.

What is claimed is:

1. A control apparatus that is applied to a hybrid vehicle, the hybrid vehicle including an internal combustion engine, an electric motor, and a storage battery that supplies electric power to the electric motor, the hybrid vehicle being configured to perform regenerative braking with the use of the electric motor and be able to charge the storage battery with electric power generated through the regenerative braking, the hybrid vehicle being also configured to be able to charge the storage battery with electric power generated by using output power of the internal combustion engine, the control apparatus comprising:
a controller configured to:
control the internal combustion engine and the electric motor such that a required driving force that is required from the vehicle is satisfied and a remaining amount of charge of the storage battery approaches a target remaining amount of charge set to a first remaining amount of charge,
acquire positional information, indicating a position of the vehicle, and road information,
determine a scheduled travel route of the vehicle on the basis of the positional information and the road information,
search for a target downhill section that satisfies a predetermined condition within the scheduled travel route on the basis of the road information pertaining to each road section that constitutes the scheduled travel route,
determine a first controlled target section when the target downhill section is included in the scheduled travel route, the first controlled target section being a section from a downhill control start point to an end point of the target downhill section, the downhill control start point being located a predetermined first distance before a start point of the target downhill section,
execute a downhill control when the vehicle travels on the first controlled target section, the downhill control being control for changing the target remaining amount of charge to a second remaining amount of charge lower than the first remaining amount of charge,
continue to execute the downhill control until the vehicle reaches an end point of the first controlled target section for which the downhill control is started even when the controlled target section is newly determined during execution of the downhill control,
determine whether the controlled target section is newly determined, and
continue to execute the downhill control until the vehicle reaches an end point of the first controlled target section for which the downhill control is started when the controller determines the controlled target section is newly determined.

2. The control apparatus according to claim 1, wherein the controller is configured to newly determine the controlled target section at a point in time at which the vehicle has passed through the first controlled target section for which the downhill control is started.

3. The control apparatus according to claim 1, wherein the controller is configured to end the downhill control when the scheduled travel route has been changed during execution of the downhill control.

4. The control apparatus according to claim 1, wherein the controller is an electronic control unit.

5. A control method that is applied to a hybrid vehicle, the hybrid vehicle including an internal combustion engine, an electric motor, and a storage battery that supplies electric power to the electric motor, the hybrid vehicle being configured to perform regenerative braking with the use of the electric motor and be able to charge the storage battery with electric power generated through the regenerative braking, the hybrid vehicle being also configured to be able to charge the storage battery with electric power generated by using output power of the internal combustion engine, the control method comprising:
controlling the internal combustion engine and the electric motor such that a required driving force that is required from the vehicle is satisfied and a remaining amount of charge of the storage battery approaches a target remaining amount of charge set to a first remaining amount of charge,
acquiring positional information, indicating a position of the vehicle, and road information, determining a scheduled travel route of the vehicle on the basis of the positional information and the road information, searching for a target downhill section that satisfies a predetermined condition within the scheduled travel route on the basis of the road information pertaining to each road section that constitutes the scheduled travel route, determining a first controlled target section when the target downhill section is included in the scheduled travel route, the first controlled target section being a section from a downhill control start point to an end point of the target downhill section, the downhill control start point being located a predetermined first distance before a start point of the target downhill section, executing a downhill control when the vehicle travels on the first controlled target section, the downhill control being control for changing the target remaining amount of charge to a second remaining amount of charge lower than the first remaining amount of charge, continuing to execute the downhill control until the vehicle reaches an end point of the first controlled target section for which the downhill control is started even when the controlled target section is newly determined during execution of the downhill control, determining whether the controlled target section is newly determined, and continuing to execute the downhill control until the vehicle reaches an end point of the first controlled target section for which the downhill control is started when the controller determines the controlled target section is newly determined.

* * * * *